(12) United States Patent
Horgan et al.

(10) Patent No.: US 9,137,013 B2
(45) Date of Patent: Sep. 15, 2015

(54) METHOD AND SYSTEM FOR A HARDWARE-EFFICIENT UNIVERSAL HASH FUNCTION

(71) Applicant: Broadcom Corporation, Irvine, CA (US)

(72) Inventors: Nick Horgan, Waban, MA (US); Daniel Rosenband, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 331 days.

(21) Appl. No.: 13/720,711

(22) Filed: Dec. 19, 2012

(65) Prior Publication Data

US 2014/0093073 A1 Apr. 3, 2014

Related U.S. Application Data

(60) Provisional application No. 61/707,536, filed on Sep. 28, 2012.

(51) Int. Cl.
*H04L 9/08* (2006.01)
*H04L 9/06* (2006.01)

(52) U.S. Cl.
CPC ............ *H04L 9/0861* (2013.01); *H04L 9/0643* (2013.01)

(58) Field of Classification Search
CPC .......................... H04L 9/0643; H04L 9/0861
USPC ........................................................... 380/44
See application file for complete search history.

(56) References Cited

U.S. PATENT DOCUMENTS

| | | | |
|---|---|---|---|
| 7,930,547 B2 * | 4/2011 | Hao et al. | 713/176 |
| 2014/0016774 A1 * | 1/2014 | Wolrich et al. | 380/28 |

* cited by examiner

*Primary Examiner* — Kambiz Zand
*Assistant Examiner* — Benjamin Kaplan
(74) *Attorney, Agent, or Firm* — Sterne, Kessler, Goldstein & Fox P.L.L.C.

(57) ABSTRACT

Disclosed method, system and computer readable storage medium embodiments for providing hardware-efficient universal hashing functions include performing a first hash function on a received input key or a bit sequence derived from the received input key to generate a hashed input key, selecting a plurality of input key portions from the hashed input key, accessing, a respective permutation table for each of the input key portions from a group of permutation tables to generate a permuted key portion, and combining at least the generated permuted key portions to form a hash value.

20 Claims, 3 Drawing Sheets

METHOD AND SYSTEM FOR A HARDWARE-EFFICIENT UNIVERSAL HASH FUNCTION

CROSS REFERENCE TO RELATED APPLICATIONS

This application claims the benefit under 35 U.S.C. §119(e) of U.S. Provisional Application No. 61/707,536 filed on Sep. 28, 2012, which is hereby incorporated by reference in its entirety.

BACKGROUND

1. Field of the Invention

Embodiments of this invention are related to hash functions.

2. Background Art

Hash functions are used in numerous applications, particularly in technologies related to network communications and security in order to achieve faster table lookups. A hash function maps a first data set, which is typically larger, to a second data set. The input to the hash function may be referred to as a "key," and the output may be referred to as a "hash value," "hash code" or "hash."

The hash value represents one or more entries in an array (also referred to as a "hash bucket") that corresponds to a particular key. A hash table is a collection of hash buckets. Each hash bucket can store any number of data items for lookup. In order to lookup a data item corresponding to a key, the key is processed by a hash function to determine a corresponding hash value. After the hash value is determined, the hash bucket within the hash table is accessed. Finding the desired data item within the hash bucket may require one or more operations to traverse through the one or more data items stored in the hash bucket.

It is strongly desired that a hash function evenly distributes the set of input keys over all the hash buckets in a hash table. When keys are distributed relatively evenly over the hash table, the expected lookup time for a key is a function of the loading factor (e.g., average number of data items stored per hash bucket) of the hash table. However, no single hash function can efficiently distribute all key sets evenly over the hash buckets. Also, any single hash function can be "defeated" with relative ease by submitting a set of keys such that excessive collisions are caused on a subset of the buckets. Due to these, and other, practical weaknesses of single hash functions, some applications dynamically select from among a plurality of related hash functions, e.g. a hash function family.

A "universal hash function" selects a hash function from among a family of such functions. The hash function may be selected randomly from the family such that predetermined mathematical properties are satisfied. Universal hash functions ensure a low number of collisions even when the keys are selected by an adversary. Universal hash functions are frequently used in areas such as implementation of hash tables, randomized algorithms, and cryptography.

Conventionally, hash functions are implemented in hardware as well as in software. Hardware-implemented hash functions can, in general, support substantially higher throughput rates than software-implemented hash functions. Exemplary hash functions used in hardware implementations include functions ranging from simple polynomial division of a key to more complex cryptographic hashes (e.g., MD4, MD5, SHA-1, and SHA-2). Polynomial division provides for high throughput and is very efficient in hardware, but has poor characteristics as a hashing function. Cryptographic hashes are typically expensive to implement in hardware and can be challenging to use in high throughput applications. Moreover, the cost of implementing cryptographic hash functions in hardware may be wasteful in lookup type applications, which are common in network and communications equipment.

However, hardware-implemented hash functions are a requirement for numerous applications, such as, for example, hashing implemented in network equipment and other communications equipment. What is needed therefore is that, in addition to the efficiency of implementation in hardware, such hash functions should also be difficult to be defeated by adversaries.

BRIEF DESCRIPTION OF THE DRAWINGS/FIGURES

Reference will be made to the embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

Figure 1:
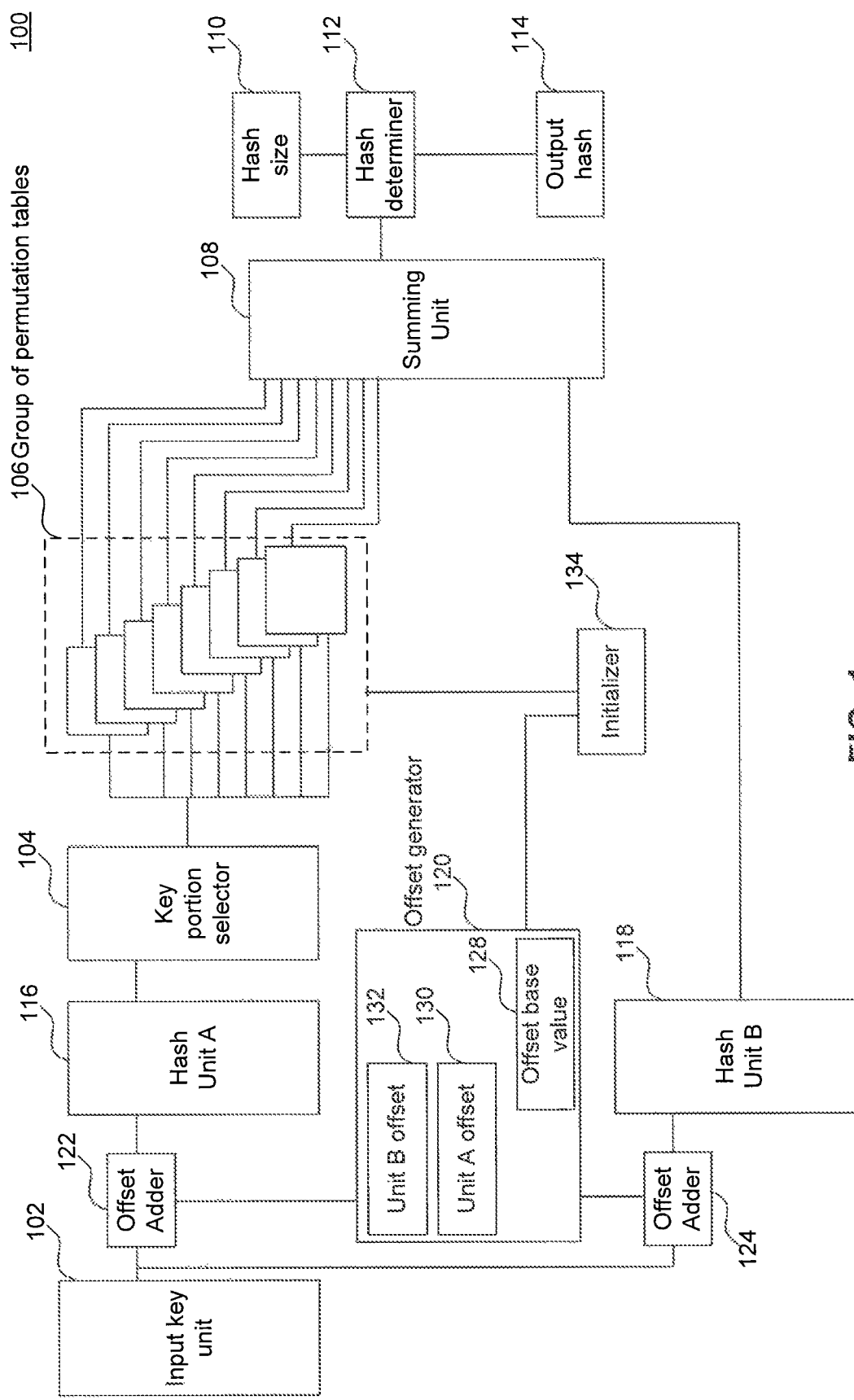
FIG. 1 illustrates a block diagram of a system for providing a universal hash function, in accordance with an embodiment.

While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Disclosed herein are universal hash functions that can be efficiently implemented in hardware to provide hashing functions which yield high resistance against defeat by adversaries and which can be used in high throughput environments, such as, in network equipment. Disclosed method, system and computer readable storage medium embodiments include performing a first hash function on a received input key or a bit sequence derived from the received input key to generate a hashed input key, selecting a plurality of input key portions from the hashed input key, accessing a respective permutation table for each of the input key portions from a group of permutation tables to generate a permuted key portion, and combining at least the generated permuted key portions to form a hash value.

Embodiments disclosed in this specification provide for hardware-efficient universal hash functions that are suitable for numerous applications, such as, but not limited to, implementation of hash tables for lookup, cryptography, and randomized algorithms. Lookup applications using these embodiments may be implemented in network forwarding, access control, and load balancing applications (e.g., distributing traffic across a set of data links in a high speed network router or bridge). The disclosed embodiments include an arbitrarily large hardware-implemented hash function family that performs efficiently and is capable of supporting the high throughput rates of network, communication and security devices.

Embodiments provide universal hash functions using a group of permutation tables. Multiple permutation tables are used to provide a very large state space in a hardware-efficient manner. The permutation tables may be programmable and may be re-initialized upon each power-on, thereby vastly improving the security (e.g., resistance to being defeated using a selected set of keys) of the hashing functions. An input key or a bit sequence derived from the input key is segmented to a plurality of key portions. Thereafter, for each of the input key portions, a lookup is performed in one of the permutation tables from the group of permutation tables to generate a permuted key portion. An output hash value can be obtained by combining the generated permuted key portions. A Cyclic Redundancy Check (CRC) or other hashing function can be performed upon the input key before it is used for looking up the permutation tables. Additionally, a second hash function may be performed upon a copy of the input key and the resulting bit sequence can be combined with the generated permuted key portions to form the output hash value. Further embodiments, include various offsets which further enhance the hash function family's membership and allow for simple yet effective on-the-fly selection of further hash functions.

By arranging, among other logic, a plurality of permutation tables, one or more hash functions, and in some embodiments, one or more offset adders, embodiments provide universal hash functions that perform well with respect to desired characteristics of hash functions even when faced with arbitrary inputs. For example, embodiments disclosed herein have good correlation with respect to a change to a bit in the input key affecting any bit in the output hash value. Additionally, as desired in hash functions for an arbitrary set of keys, embodiments display good correspondence of hash bucket length distribution to a uniformly distributed set of keys. In embodiments, the use of a very large hash function family and a "secret" selection function contributes to making the particular hash function selected in any instance practically impossible to be defeated by an adversary. Furthermore, the random selection of a particular function on power-up or during rehashes ensures that the function in use on one instance does not reveal any information about the function in use on another instance.

FIG. 1 illustrates a block diagram of a system 100 configured to provide a universal hash function, in accordance with an embodiment of the present invention. System 100 may be a standalone system for generating hash values in accordance with a universal hash function. System 100 may also be integrated in a larger system such as, but not limited to, a database lookup system, a network load balancing system, a hash table implementation, or a security system (e.g. cryptographic system). System 100 may include an input key unit 102, a key portion selector 104, a group of permutation tables 106, a summing unit 108, a hash determiner 112, a hash size unit 110, an output hash unit 114, hash units 116 and 118, and offset adders 122 and 124.

Input key unit 102 may include one or more registers or other memory to store a received input key for use by system 100 in determining a corresponding hash. One or more other devices or applications may write or store values to input key unit. Devices and/or applications from which input keys are received may include, but are not limited to, database lookup engines, network load balancers, and security engines. Input key unit 102 may be configured to enable the accommodation of keys of one or more predetermined sizes, e.g., 32-bit, 64-bit or 128-bit keys.

In some embodiments, system 100 can include one or more offset adders 122 and 124. Offset adders 122 and 124 operate to enable an efficient technique to select a hash function from a family of hash functions. According to an embodiment, offset adders 122 and 124 perform the arithmetic addition of the input key and a respective offset. The addition may be performed modulo two raised to the power of the width of the input key so that the input key is linearly transformed to the subsequent hash functions. For a constant offset, no two keys can produce the same output from an offset adder 122 or 124.

Offset adder 122 is coupled to input key unit 102 and hash unit A 116. Offset adder 124 is coupled to input key unit 102 and hash unit B 118. Offset adders 122 and 124 receive a key from input key unit 102 and offsets from offset generator 120.

The respective offsets, unit A offset 130 and unit B offset 132, may be derived from a single base offset value 128. According to an embodiment, unit A offset=base offset value and unit B offset=−base offset value. In other embodiments, unit A offset and unit B offset may be mathematically related by means other than a single base offset value. An offset generator 120 may operate to generate unit A offset 130 and unit B offset 132. Unit A offset 130 and unit B offset 132 may be values stored in registers or other memory.

System 100 also includes hash unit A 116 and hash unit B 118. Hash unit A 116 may be coupled to one or both input key unit 102 or offset adder 122 to receive input, and to key portion selector 104 for output. Hash unit A 116 may operate to take as input either the input key or a bit sequence derived from the input key and executes a hash function to produce a hashed bit sequence. The hashed bit sequence output by hash unit A 116 is then input to key portion selector 104. Thus, according to an embodiment, the output of hash unit A 116 should have a number of bits equal to the sum of the widths of indices into the permutation table.

According to an embodiment, hash unit A 116 includes a CRC function. CRC functions are well suited for implementation in binary hardware. In an exemplary embodiment, the CRC implemented in hash unit A 116 has a width of 64 bits. Hash unit B 118 may be coupled to one or both input key unit 102 or offset adder 124 to receive input, and to summing unit 108 for output. Hash unit B 118 operates to take as input a bit string and produce a hashed bit string which is combined with the output of permutation tables 106. The combining of the outputs of permutation tables 106 and hash unit B 118 may be performed in summing unit 108.

According to an embodiment, hash unit B 118 too includes a CRC. In the exemplary embodiment, the CRC implemented in hash unit B 118 has a width of 32 bits. In order to obtain better hash properties, it is desired that the polynomials used for the CRCs in 116 and 118 differ from each other.

The CRC functions included in hash unit A 116 and hash unit B 118 may include, but are not limited to CRC16, CRC32, CRC64, CRC128, or CRC256, which produce, respectively 16-bit, 32-bit, 64-bit, 128-bit or 256-bit hash values. As would be appreciated by a person of ordinary skill in the art, different hash functions can be used in one or both of hash unit A 116 and hash unit B 118. According to some embodiments, hash functions other than CRC may be used in hash unit 118. Exemplary hash functions that may be implemented include, but are not limited to, checksums, SHA hash functions, or message digest (MD) hash functions.

Key portion selector 104 operates to select from the key, or from a bit sequence derived from the key, a plurality of key portions. The selected key portions may be of a predetermined fixed size or of variable sizes. According to an embodiment, key portion selector 104 is configured to divide a bit sequence (e.g. 64-bit bit sequence) into separate bit sequences of a predetermined length (e.g. 8 sequences of 8 bits each). In other embodiments, each key portion may include bits that are not sequential in the input provided to key portion selector 104. For example, a key portion may include every $n^{th}$ bit in the received bit sequence. The bits for each key portion may be arbitrarily selected, for example, using one or more multiplexors.

Group of permutation tables 106 includes a plurality of permutation tables. Each permutation table is used to derive a permutation of the bits in one of the key portions. A table is indexed by a portion of the key (hashed key) generated by key portion selector 104. According to an embodiment, the portions selected for indexing the permutation tables do not overlap each other, and the union of the selected subsets covers all the bits of the bit sequence (e.g. key or hashed key). According to an embodiment, the respective permutation tables are indexed by successive bytes of the input key or the bit sequence derived from that input key that is used as input to the permutation tables. In an exemplary embodiment, where the input is a 64-bit bit sequence and group of permutation tables 106 consists of 8 tables, the first and last permutation tables are indexed by the least significant byte and the most significant byte, respectively, of the input bit sequence. Each table in this example embodiment has 256 entries. The width of the tables may be equal to the size of the desired output hash value. Thus, if the width in the exemplary embodiment is 32 bits, then the 8 tables, each with 256 entries of 32 bits each, results in a total storage of 64 Kb for the tables.

The permutation tables can be configured such that they all have the same size. Alternatively, one or more tables may be configured for a different size than the other tables. Having permutation tables of variable sizes require variable size input key portions and may also require that system 100 can process variable sized permuted key portions (e.g. summing variable sized permuted key portions in the summing unit described below).

According to another embodiment, the index of a permutation table may be based upon non-sequential bits from the bit sequence to be used as input to the tables. For example, given a 64-bit input bit sequence as input to 8 tables, each table having an 8-bit index value, an index value may be constructed with every $8^{th}$ bit starting at one of the bits in the least significant byte in the input bit sequence.

By using multiple permutation tables to separately determine permutations of portions of the input key (or portions of a bit sequence derived from the input key), disclosed embodiments provide a large state space in a hardware-efficient manner. The permutation tables may be stored in register memory, random access memory, or other type of memory that is efficient for a particular embodiment.

The multiple permutation tables, among other aspects, enable spreading the effect of a change of any input bit (e.g. bit from the input key) over multiple bits in the output hash value. When used in combination with CRC or other hash functions, the permutation tables may hide the determinism in the way that CRC or other hash functions spread the effect of a change in an input bit over multiple output bits.

The permutation tables 106 may be initialized by an initializer 134. Initialization may include a true random number generator. The initialization may be performed upon each power-cycle using a true random generator.

Summing unit 108 operates to combine the plurality of permuted bit sequences generated by the permutation tables based upon the input bit sequence. The combining logic may include an arithmetic sum or a logical XOR of the bit strings to be combined. According to an embodiment, summing unit 108 operates to combine the plurality of permuted bit sequences from the permutation tables 106 with another bit sequence derived from a copy of the input key.

Hash determiner 112 determines an output hash value 114 based upon the output from summing unit 108 and based upon a predetermined hash size 110. Hash determiner 112, according to an embodiment, operates a modulo function based upon the preconfigured hash size 110. The modulo function is configured to ensure that the output hash value is less than the hash size 110 which represents the size of the hash table.

Hash size 110 and output hash value 114 may be implemented as registers or other form of memory. Hash size 110 represents that size of the hash table may be configurable as appropriate for selected applications. System 100 may be preconfigured with a default size of the hash table. A person of skill in the art will appreciate that the hash table size, may affect other aspects of system 100. For example, the size of permutation tables 106 may be affected by a change in the hash table size, and may also affect the selection or size of the input key portions.

Output hash value 114 may be configured to be accessible to another device or application, for example, to provide access to the hash values produced by system 100.

Figure 2:
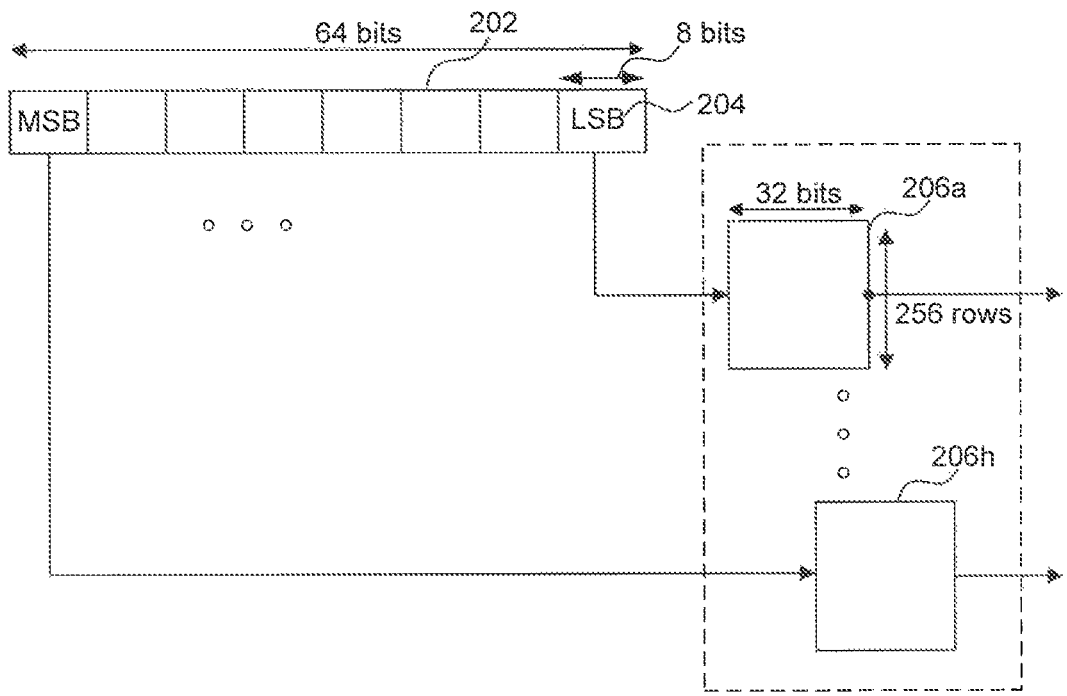
FIG. 2 is a block diagram illustration of permutation tables, in accordance with an embodiment.

FIG. 2 is a more detailed block diagram of the permutation tables in accordance with an embodiment. Permutation tables 206*a* . . . 206*h* are separately accessible using respective portions of a key or a bit sequence 202 derived from a key. In the illustrated embodiment, each permutation table 206*a* . . . 206*h* has 256 rows of entries and each entry is 32 bits wide.

Bit sequence 202 may be, for example, the output of hash unit A 116. As illustrated in FIG. 2, the 64-bit bit sequence 202 may be segmented (for example, by key portion selector 104) to 8 key portions, each portion having 8 consecutive bits from bit sequence 202. Each portion is used as an index to exactly one of the permutation tables 206*a* . . . 206*h*. For example, portion 204, which is shown as the least significant byte of bit sequence 202, may be used as the index to access permutation table 206*a* and the most significant byte can be used to access permutation table 206*h*. The output from each permutation table is the entry stored in the row that is accessed based upon the corresponding key portion.

Figure 3:
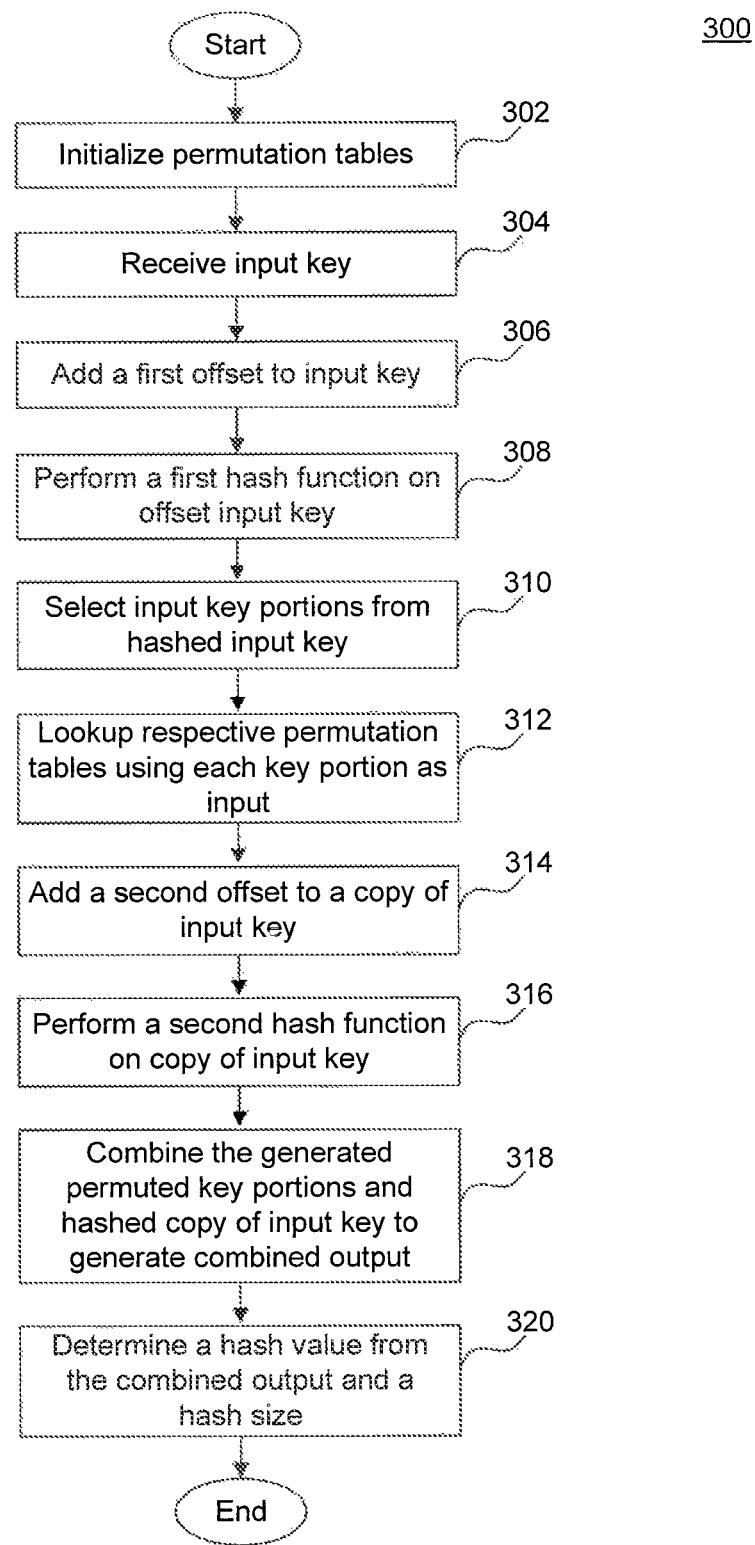
FIG. 3 illustrates a flowchart of a method for providing a universal hash function, in accordance with an embodiment.

FIG. 3 illustrates a flowchart of a method 300 to provide a universal hash function, according to an embodiment of the present invention. The system 100 can produce a hash value from an input key in accordance with method 300. In embodiments, one or more of the steps 302-320 may be omitted, and/or executed in an order other than that shown in FIG. 3. Moreover, in some embodiments, one or more steps may be performed in parallel with the other steps. Although described below with respect to the device arrangement of system 100, persons of skill in the relevant arts will appreciate that method 300 can be used for universal hashing with different arrangements than shown in system 100.

At step 302, the group of permutation tables 106 is initialized. The initialization may be performed upon power-up of system 100 by initializer 134. The initialization is preferably performed using a true random bit value generator which generates 0 and 1 values with equal probability. In an exemplary embodiment in which the group of permutation tables have 64 Kb of storage (e.g., 8 tables of 256 entries each, where each entry has 32 bits), randomly initializing the tables yields a state from among $2^{64K}$ equally possible states. Having the initial state selected from among a very large state space from one power cycle of system 100 to the next helps ensure that adversaries are thwarted in generating a set of keys which could defeat particular hash functions.

Initializing can also include initializing a base offset value, such as base offset value 128 illustrated in FIG. 1, and determining of first and second offsets (e.g., offsets 130 and 132)

based upon the base offset value. The base offset value may be configured or may be randomly generated.

At step 304, an input key is received. An input key, sometimes referred to simply as "key", may be received from an application and/or other device that uses system 100 to determine corresponding hash value. As noted above, the determined hash value may be used to access a hash table in order to obtain the desired data that is stored in the hash table.

At step 306, a first offset is added to the input key. In some embodiments, step 306 is optional. For example, unit A offset 130 may be added to the input key by offset adder 122. According to an embodiment, the addition is performed modulo 2 raised to the power of the width of the key. The modulo addition linearly transforms the input key for use in subsequent processing. For a constant first offset, no two keys can result in the same output value from the adder. The addition of a predetermined offset to an input key provides for an efficient technique to control the selection between different hash functions from a hash function family.

At step 308, a first hash function is performed upon the input key or offset input key. The first hash function may be performed, for example, by hash unit A 116 shown in FIG. 1. When an offset is calculated, the input to the first hash function is the offset input key output from offset adder 122. If offset is not determined, then the input to the first hash function is the input key from input key unit 102.

The first hash function, according to an embodiment, is a CRC. The width of the input to the first hash function may exceed the width of its output. A CRC function provides a one-to-one mapping of inputs with width less than the CRCs polynomial divisor. For example, a CRC64 generator generates a 64 b CRC (e.g. 64 bit wide CRC). If the input to the generator is less than or equal to 64 b, then the generator maps that input to a unique output. Therefore, no two inputs that have widths less than or equal to 64 b produce the same output. In some embodiments, a hash function other than CRC may be used.

At step 310, one or more input key portions are selected from the hashed input key. For example, input key portions may be selected by key portion selector 104 shown in FIG. 1.

The number of the key portions, according to an embodiment, equals the number of permutation tables in the group of permutation tables. The size of the key portions may be the same for all key portions, or may differ for one or more of the key portions. The size of the key portions can be based upon the size of the index into the respective permutation tables.

According to an embodiment, fixed size (e.g., 8 bit) key portions are selected sequentially starting from the least significant byte of a 64 bit hashed key. For example, FIG. 2 illustrates a 64-bit value (e.g. key or hash) separated into 8 portions. In other embodiments, key portions may comprise bits from the hashed key according to any other pattern. For example, a particular key portion may comprise a sequence of bits that corresponds to every $8^{th}$ bit from the hashed key.

One or more embodiments are configured such that each and every bit of the hashed key is included in exactly one key portion. Having every bit of the hashed key included in the key portions may yield the most desirable properties, such as, for example, providing for a change in any one of the bits in the input key affect a change in the hash. However, some other embodiments may be configured to have one or more selected bits from the hashed key in none, one, or more than one key portions.

At step 312, lookup of the respective permutation tables is performed. For each key portion determined by key portion selector 104, a corresponding permutation table from group of permutation tables 106 may be accessed. According to an embodiment, each key portion is used as an index to access an entry in a respective permutation table. Upon accessing a corresponding permutation table, an entry stored in the accessed location may be returned. According to an embodiment, each permutation table has an 8-bit index to uniquely address 256 entries.

Each entry in a permutation table has a width that is equal to the width of the desired hash (e.g., the width of the final hash output from system 100). Having entries that have widths equal to the width of the desired hash facilitates hardware implementation. In the exemplary embodiment, the width of each entry is 32 bits. However, other widths of table entries are possible. Each table may yield a portion of the bits required for the final hash value. For example, each table entry may be 8 bits wide, yielding 8 consecutive bits for the desired hash value (instead of yielding an output that is the entire width of the desired hash value).

At step 314, a second offset is added to a copy of the input key. In some embodiments, step 306 is optional. For example, unit B offset 132 may be added to the input key at offset adder 124. This operation, which is being performed upon a the input key, may be carried out in parallel to any one of the steps 202-212. As stated with respect to step 206 above, the addition of an offset to the key is a convenient technique to facilitate selection from among the numerous available hash functions from the family of hash functions.

The offset added in step 306 and the offset added to the input key in this step can be derived from the same base value. For example, unit A offset 130 and unit B offset 132 may both be derived from offset base value 128. In some embodiments, the base offset and/or the relationship between the base offset and each of the unit A offset and unit B offset may be configurable.

At step 316, a second hash function is executed. Specifically, the offset copy of the input key is subjected to the second hash function to produce a hashed copy of the input key.

The second hash function may, like the first hash function discussed in step 306, be a CRC. In both the first and second hash functions, the input width to the hash function may exceed the output width. The first and second hash functions may have different output widths. In the exemplary embodiment shown in FIG. 1, the hash unit A and hash unit B may be configured to output a 64 bit value and a 32 bit value, respectively.

At step 318, the generated permuted key portions output from the permutation tables and the hashed copy of the input key output from the hash unit B are combined to generate a combined hash. The combining may be performed by summing unit 108. In the described exemplary embodiment, summing unit 108 uses a logical XOR operation to sum the respective outputs of the permutation tables and the output of the second hash function. In other embodiments, other summation logic such as, but not limited to, an arithmetic sum may be employed.

At step 320, the hash value is determined. As illustrated in FIG. 1, hash determiner 112 may take as input the output from summing unit 108 and a preconfigured hash size to output the hash value (e.g., the final hash output from system 100). Hash determiner 112 may determine the hash value as the modulo hash size of the output from summing unit 108. By performing modulo hash size operation, hash determiner 112 ensures that the final hash value that is output from system 100 is within the desired bounds (e.g., <hash size).

The determined hash value may be written to a register location or memory, or may be returned to an application. An application may use the hash value to access and/or store data items in a corresponding hash bucket.

In the above disclosed embodiments, the permutation tables generally yield a shorter output than a submitted input (e.g., many-to-one relationship between input and output). Such a many-to-one relationship is desired for hashing from a larger input data set to a smaller hash table. In another embodiment, however, the permutation tables may be configured to yield a one-to-one relationship between input and output bits. Such a one-to-one relationship can be used, for example, in a scrambling application.

The processing logic disclosed herein for providing universal hash functions can be implemented in hardware, software, or some combination thereof. For example, method 300 and systems illustrated in FIGS. 1 and 2 can be implemented using computer processors, computer logic, ASIC, FPGA, DSP, etc., as will be understood by those skilled in the arts based on the discussion given herein. Accordingly, any processor that performs the processing logic described herein is within the scope and spirit of the present invention. The processing logic, encoded in a hardware description language or other computer programming language, may be stored in a computer-readable storage medium such as a memory, hard disk, flash disk, or other form of non-transitory digital storage medium.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for providing a universal hash function, comprising:
performing a first hash function using a received input key or a bit sequence derived from the received input key to generate a hashed input key;
selecting a plurality of input key portions from the hashed input key;
accessing, for each of the selected input key portions, a respective permutation table from a group of permutation tables to generate a permuted key portion; and
combining at least the generated permuted key portions to form a hash value.

2. The method of claim 1, further comprising:
initializing each permutation table of the group of permutation tables to provide random bit sequences responsive to respective ones of the input key portions.

3. The method of claim 1, further comprising:
configuring each said permutation table to take as input a respective subset of the hashed input key, wherein the respective subset does not overlap any other subset of the hashed input key, and wherein a union of subsets of the input key taken as input to the permutation tables cover all bits of the hashed input key.

4. The method of claim 1, further comprising:
adding a first offset to the received input key before the performing to generate the bit sequence derived from the received input key.

5. The method of claim 1, further comprising:
performing a second hash function using a copy of the received input key or a second bit sequence derived from the received input key to form a second hashed input key;
wherein said combining at least the generated permuted key portions comprises:
further combining the generated permuted key portions and the second hashed input key.

6. The method of claim 5, further comprising:
adding a second offset to the copy of the received input key before performing the second hash function to generate the bit sequence derived from the copy of the received input key.

7. The method of claim 6, further comprising:
adding a first offset to the received input key before performing the first hash function to generate the bit sequence derived from the received input key.

8. The method of claim 7, further comprising:
determining the first offset and the second offset based upon a single offset value.

9. The method of claim 5, further comprising:
configuring a first cyclic redundancy check as the first hash function; and
configuring a second cyclic redundancy check as the second hash function, wherein a polynomial for the second cyclic redundancy check is different from a polynomial for the first cyclic redundancy check.

10. The method of claim 9, wherein the configuring a second cyclic redundancy check comprises:
configuring the second cyclic redundancy check with a width different from that of the first cyclic redundancy check.

11. A system for providing a universal hash function, comprising:
a first hashing unit configured to perform a first hash function using the received input key or a bit sequence derived from the received input key to generate a hashed input key;
a key portion selector configured to select a plurality of input key portions from the hashed input key;
a key permutation unit configured to access, for each of the input key portions, a respective permutation table from a group of permutation tables to generate a permuted key portion; and
a combining unit configured to form a hash value from at least the generated permuted key portions.

12. The system of claim 11, wherein each of the permutation tables is configured to take a respective subset of the hashed input key as input, wherein the respective subset does not overlap any other subset of the hashed input key, and wherein a union of subsets of the hashed input key taken as input to the permutation tables covers all bits of the hashed input key.

13. The system of claim 11, further comprising a permutation table initializer configured to initialize each permutation table of the group of permutation tables to provide a random bit sequence responsive to a hashed input key portion.

14. The system of claim 11, further comprising:
a second hashing unit configured to perform a second hash function using a copy of the received input key or a bit sequence derived from the copy of the received input key to form a second hashed input key,
wherein the combining unit is further configured to form the hash value from at least the generated permuted key portions and the second hashed input key.

15. The system of claim 14, further comprising:
a first offset adder configured to add a first offset to the received input key before performing the first hash function; and
a second offset adder configured to add a second offset to the copy of the received input key before performing the second hash function.

16. The system of claim 15, further comprising:
an offset generator configured to generate the first offset and the second offset based upon a single offset value.

17. The system of claim 14, wherein the first hashing unit is configured to perform a first cyclic redundancy check, wherein the second hashing unit is configured to perform a second cyclic redundancy check, and wherein the first cyclic redundancy check and the second cyclic redundancy check yield outputs of different width.

18. The system of claim 11, wherein the combining unit comprises:
a summing unit configured to sum the generated permuted key portions and the second hashed input key; and
a hash output unit configured to determine the hash value based upon an output from the summing unit and a hash size.

19. A computer-readable storage medium storing instructions that, when executed by a processor, causes the processor to execute a method for a universal hash function comprising:
performing a first hash function using a received input key or a bit sequence derived from the received input key to generate a hashed input key;
selecting a plurality of input key portions from the hashed input key;
accessing, for each of the input key portions, a respective permutation table from a group of permutation tables to generate a permuted key portion; and
combining at least the generated permuted key portions to form a hash value.

20. The computer-readable storage medium of claim 19, wherein the method further comprises:
performing a second hash function using a copy of the received input key or a second bit sequence derived from the received input key to form a second hashed input key;
wherein said combining the permuted key portion generated for each of the input key portions comprises:
further combining the generated permuted key portions and the second hashed input key.

* * * * *